United States Patent [19]

Sandberg et al.

[11] 4,418,446
[45] Dec. 6, 1983

[54] MOLD ASSEMBLY FOR FOOD PATTY MOLDING MACHINE

[75] Inventors: Kenneth Sandberg, Lockport; James Stoub, Oak Forest, both of Ill.

[73] Assignee: Formax, Inc., Mokena, Ill.

[21] Appl. No.: 361,186

[22] Filed: Mar. 24, 1982

Related U.S. Application Data

[63] Continuation of Ser. No. 240,955, Mar. 5, 1981, abandoned.

[51] Int. Cl.³ .............................................. A22C 7/00
[52] U.S. Cl. ...................................... 17/32; 425/461; 426/513
[58] Field of Search ................. 17/32, 45; 426/512, 426/513; 425/461, 465

[56] References Cited

U.S. PATENT DOCUMENTS

| 2,489,951 | 11/1949 | Bump | 425/461 |
|---|---|---|---|
| 2,832,093 | 4/1958 | Whitaker | 17/32 |
| 2,958,093 | 11/1960 | Jenkins | 17/32 |
| 3,526,923 | 9/1970 | Barnes, Jr. | 17/32 |
| 3,940,217 | 2/1976 | McCarthy et al. | 17/32 |
| 4,126,704 | 11/1978 | McCarthy et al. | 17/32 X |

FOREIGN PATENT DOCUMENTS 595833 4/1934 Fed. Rep. of Germany .......... 17/32

*Primary Examiner*—Willie G. Abercrombie
*Attorney, Agent, or Firm*—Kinzer, Plyer, Dorn & McEachran

[57] ABSTRACT

A mold assembly for molding ribbed food patties in a food patty molding machine of the kind having a mold plate, including at least one mold cavity, sliding reciprocally in surface-to-surface engagement between two closure plates, from a fill position to a discharge position and back to the fill position. In the mold assembly, a series of rib-forming channels, each of uniform cross-sectional shape, are formed in the mold plate engaging surface of one closure plate, each channel receiving a close-fitting complementary rib-forming projection on the engaged mold plate surface. The rib-forming channels and projections extend parallel to the path of movement of the mold plate. Supplemental edge rib pockets or projections may be provided in the mold cavity.

5 Claims, 7 Drawing Figures

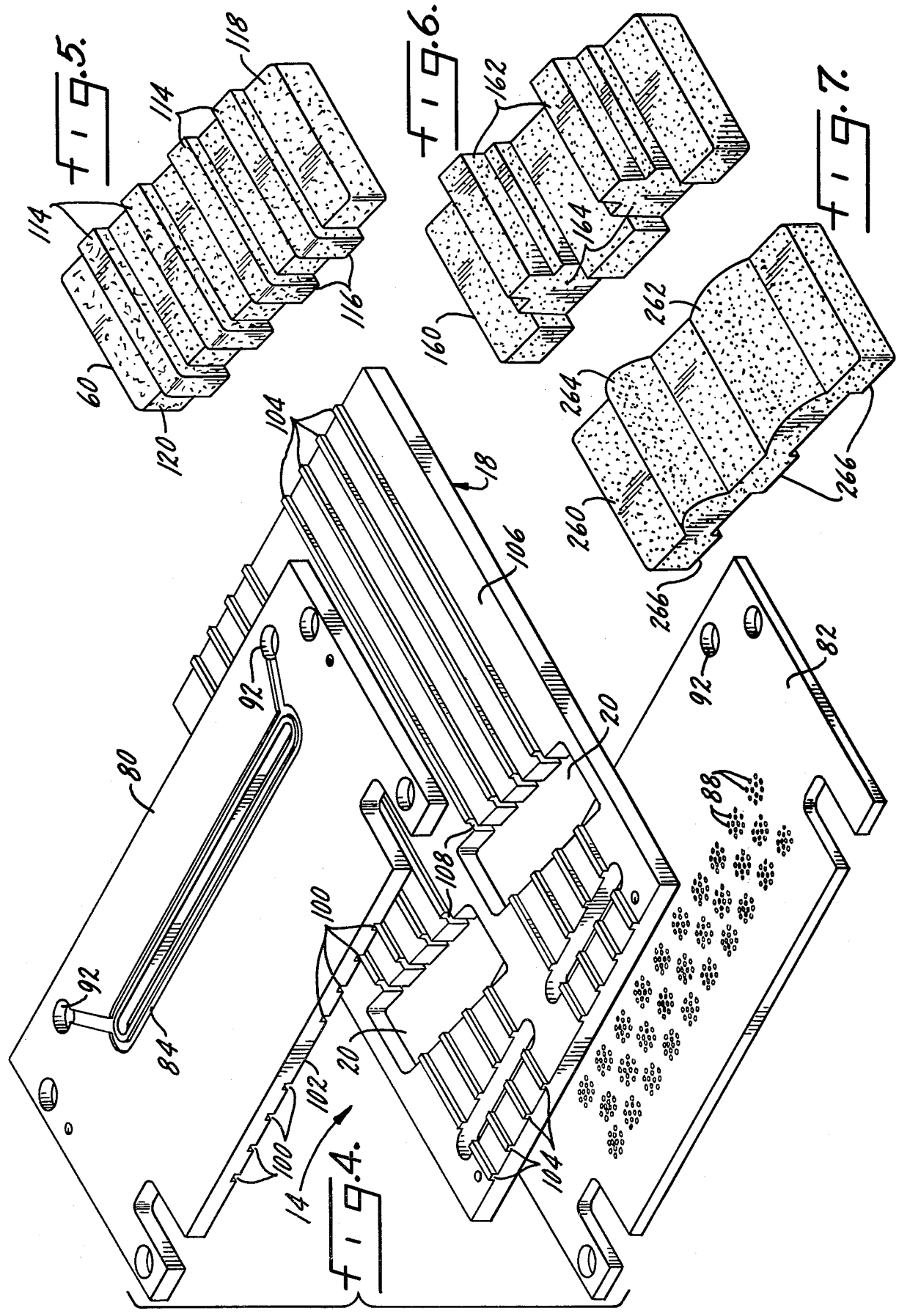

MOLD ASSEMBLY FOR FOOD PATTY MOLDING MACHINE

This is a continuation of application Ser. No. 240,955, filed Mar. 5, 1981, now abandoned.

BACKGROUND OF THE INVENTION

Hamburger patties are frequently manufactured at a central location, using high-speed high-volume patty molding machines, and subsequently distributed to restaurants, grocery stores, and other retail outlets. Patties of flaked or shredded meat, fish, and vegetable foods may also be handled in this manner. The term "food product", as used in this specification and in the appended claims, refers to any of the various foods identified above and to others having similar properties.

In many high-volume patty molding machines, the food product is fed from a supply hopper into a food pump that pumps the food product, under pressure, into a mold cavity in a mold plate. The mold cavity is actually an aperture extending completely through the mold plate. The mold plate is moved cyclically, between two surface closure plates, from a fill position to a discharge position and back to the fill position.

These high-volume patty molding machines can produce food patties of widely varying peripheral shapes. The most frequently used shape is of circular outline, but square, rectangular, oval, parallelogram, and irregular configurations are easily obtained. The main surfaces of the patties, however, are always flat. Relatively low-volume machines capable of producing food patties with non-planar main surfaces have been proposed; as an example, see Peterson U.S. Pat. No. 3,913,175. But there has been no mold assembly for a high-volume sliding mold plate patty molding machine capable of providing anything other than flat main surfaces on the patties.

SUMMARY OF THE INVENTION

The principal object of the present invention, therefore, is to provide a new and improved mold assembly for a food patty molding machine, of the kind employing a reciprocating mold plate, enabling the production of food patties having non-planar main surfaces.

A specific object of the invention is to provide a new and improved mold assembly permitting high-volume production of ribbed food patties in a patty molding machine of the sliding mold plate type.

Accordingly, the invention relates to an improved mold assembly for use in a food patty molding machine of the kind comprising a mold plate including at least one mold cavity extending through the plate, a pair of mold closure plates engaging opposed surfaces of the mold plate in close-fitting surface-to-surface engagement, mold plate drive means for cyclically driving the mold plate along a given path, between the closure plates, from a fill position to a discharge position and back to the fill position, a fill passage having one end extending through one closure plate, communicating with the mold cavity when the mold plate is in its fill position, and a food pump for pumping a moldable food product through the fill passage into the mold cavity. The mold assembly, enabling the machine to form patties having non-planar main surfaces, comprises at least one rib-forming channel of uniform cross-sectional shape throughout its length formed in the surface of a closure plate engaging a given surface of the mold plate, the rib-forming channel extending longitudinally of the closure plate surface parallel to the path of movement of the mold plate and traversing the mold cavity, and a rib-forming projection, complementary in cross-sectional shape to the rib-forming channel, extending longitudinally of the given surface of the mold plate into close-fitting sliding engagement in the rib-forming channel.

BRIEF DESCRIPTION OF THE DRAWINGS

FIG. 4 is an exploded perspective view of the mold assembly;

FIG. 5 is a perspective view of a food patty produced by the apparatus of FIGS. 1-4; and FIGS. 6 and 7 are perspective views of other food patties that can be produced using the present invention.

DESCRIPTION OF THE PREFERRED EMBODIMENT

Figure 1:
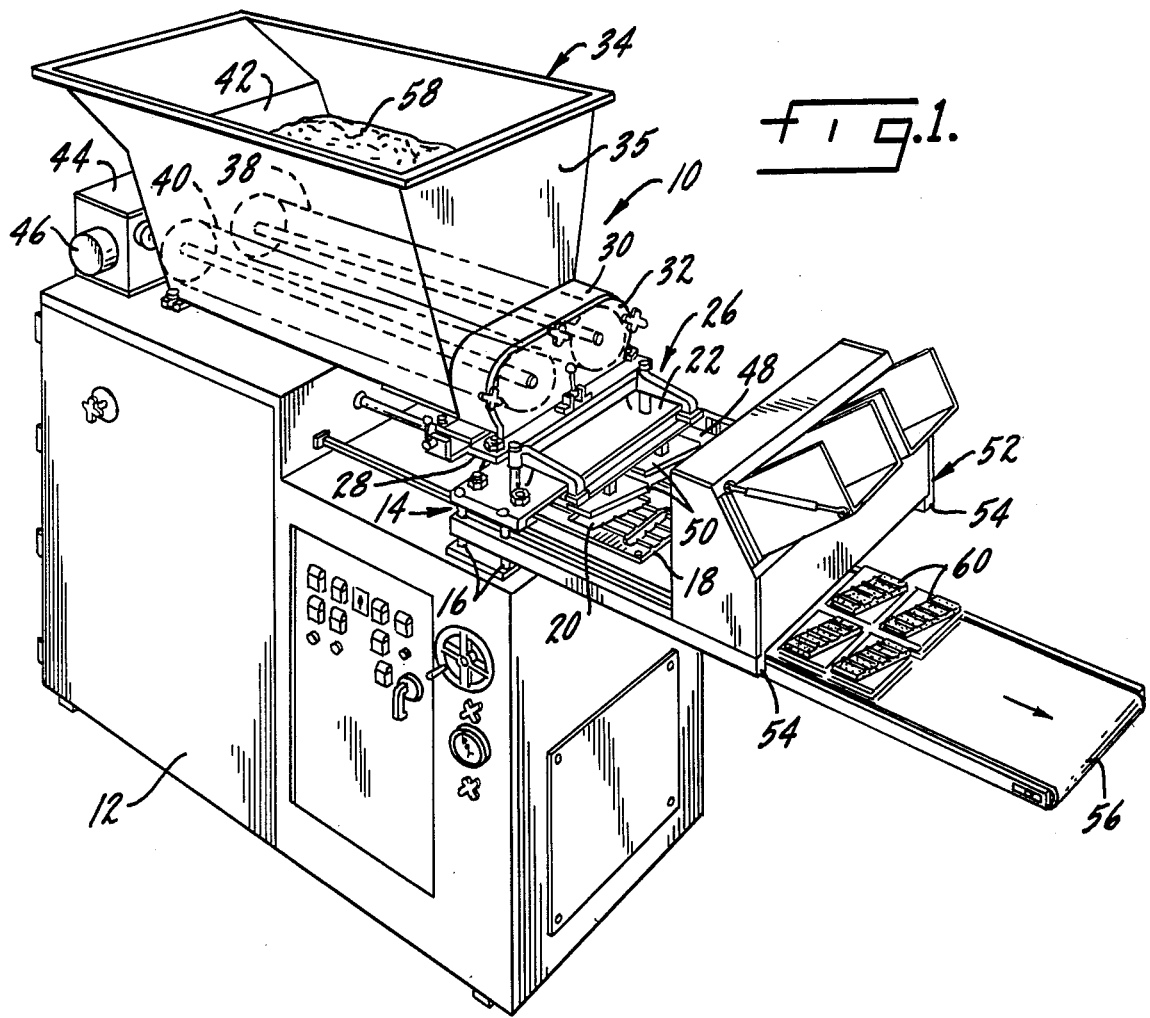
FIG. 1 is a perspective view of a food patty molding machine that includes a mold assembly constructed in accordance with a preferred embodiment of the invention.

FIG. 1 affords a general illustration of a food patty molding machine 10 incorporating a mold assembly constructed in accordance with a preferred embodiment of the present invention. Machine 10 corresponds, structurally and operationally, to the patty molding machine of LaMartino et al U.S. Pat. No. 4,182,003. However, the mold assembly of the invention can equally well be incorporated in other patty molding machines, such as the machines of Richards et al U.S. Pat. No. 3,887,964 and Sandberg et al U.S. Pat. No. 4,054,967, and numerous others, as will be apparent from the following description.

Near the righ-hand end of the enclosed base 12 of molding machine 10 there is a mold plate assembly 14 supported on a series of vertical posts 16. A mold plate 18, slidably mounted in assembly 14, includes a plurality of mold apertures or cavities 20 that extend completely through the plate. In FIG. 1, mold plate 18 is shown in its fully extended discharge position.

Figure 3:
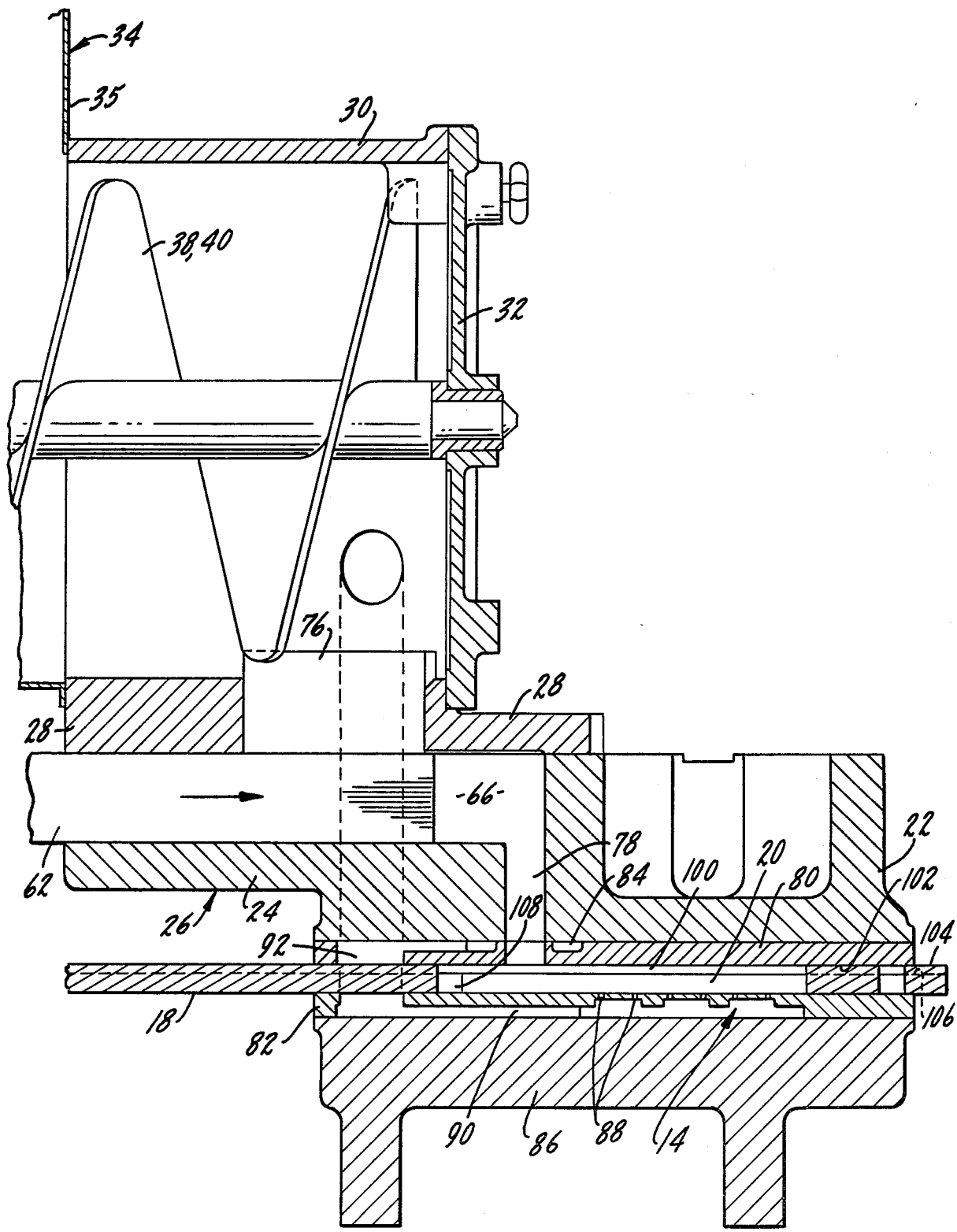
FIG. 3 is a sectional elevation view of the molding mechanism of the patty molding machine of FIG. 1, showing the improved mold assembly.

The top 22 of the mold plate assembly 14 is a part of a casting constituting the base 24 (see FIG. 3) of a housing for a food pump 26. The cover 28 of the food pump housing also constitutes the base of a feed screw end housing 30, equipped with a removable front cover 32 (FIGS. 1 and 3). The feed screw end housing 30 projects outwardly of the front wall 35 of a food product supply hopper 34 mounted on base 12.

Two counter-rotating feed screws 38 and 40 (FIG. 1) extend across the bottom of hopper 34. The feed screw shafts each have one end journalled in a bearing in the front wall 32 of housing 30. The opposite ends of the feed screw shafts project through the rear wall 42 of hopper 34 and into a gear box 44. Gear box 44 incorporates a right-angle gear drive connecting the feed screws to a hydraulic motor 46.

A knock-out mechanism 48 comprising a plurality of knock-out members 50 is located just beyond food pump 26 at the right-hand end of machine 10, FIG. 1.

The knock-out mechanism 48 is aligned with a paper applicator 52 mounted upon a pair of support rails 54 that project outwardly to the right of base 12. The knock-out mechanism 48 and paper applicator 52 are located above a takeaway conveyor 56. Paper applicator 52 may be a vacuum sheet applicator of the kind disclosed in Richards et al U.S. Pat. No. 3,952,478.

Figure 2:
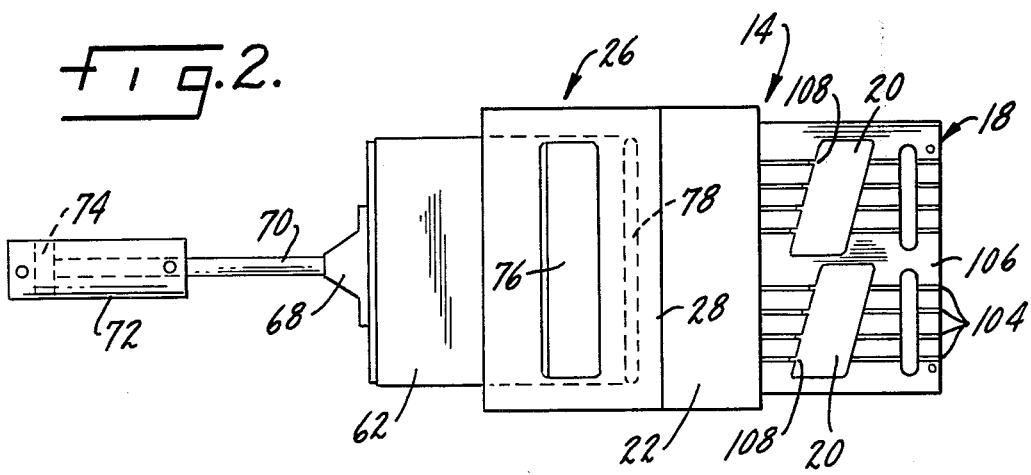
FIG. 2 is a partly schematic plan view of the food pump and mold assembly for the patty molding machine of FIG. 1.

As shown in FIGS. 2 and 3, food pump 26 includes a plunger 62 which projects into a pump chamber 66 defined by the pump housing cover 28 and base 24. Plunger 62 is connected by a yoke 68 to a piston rod 70 that extends into a double-acting hydraulic cylinder 72 and is connected to a piston 74 within the cylinder (FIG. 2).

The pump box housing cover 28 has an intake opening 76 that extends for approximately the full width of plunger 62, as shown in FIG. 2. Opening 76 is made relatively large to provide free access for movement of food product from the interior of feed screw housing 30 into pump chamber 66 (see FIG. 3). The opposite end of pump chamber 66 is in communication with a long, narrow fill passage 78 (FIGS. 2 and 3); passage 78 extends downwardly through pump base 24 and constitutes the outlet for pump 26.

As best shown in FIG. 3, the mold assembly 14 includes an upper closure plate 80 and a lower closure plate 82, with mold plate 18 disposed in close-fitting sliding relation between the two closure plates. The upper closure plate 80 is sometimes referred to as a fill slot plate; the lower closure plate 82 is sometimes called a breather plate. The fill passage 78 continues downwardly through the fill slot closure plate 80 into communication with mold plate 18. Preferably, the fill slot plate 80 incorporates the pressure-relief construction described and illustrated in Richards U.S. Pat. No. 4,097,961, as indicated by the relief channel 84. The breather plate 82 includes a multiplicity of breather apertures 88 connected by relief channels 90 to two relief passages 92 that lead back to the housing 30; relief channels 84 are also connected to passages 92. A heavy, rigid base member 86 completes the mold assembly 14.

In the operation of the patty molding machine 10, a quantity of ground meat or other food product 58 is deposited in supply hopper 34; in one commercial embodiment of machine 10 hopper 34 has a capacity of five hundred pounds of ground meat. The two feed screws 38 and 40 advance the food product into the feed screw end housing 30, which leads directly to the intake opening 76 of food pump 26. Mold plate 18 is driven cyclically between the discharge position shown in FIG. 1 and a fill position (FIG. 3) in which the mold cavities 20 are aligned with fill passage 78.

In each cycle of operation of mold plate 18, mold cavities 20 are pumped full of food product by pump 26, following which the mold plate is moved outwardly to the discharge position (FIG. 1) where the patties formed in the mold cavities are discharged by knock-out members 50 onto conveyor 56. In machine 10, as illustrated, a sheet of paper is applied to each patty by paper applicator 52. The operation of conveyor 56 may be arranged to advance the conveyor only after a given number of cycles of mold plate 18 so that the food patties 60 emerge on the conveyor in stacks as shown in FIG. 1.

Mold assembly 14, in the construction illustrated in FIGS. 1–4, comprises a preferred embodiment of the present invention. In mold assembly 14, a plurality of rib-forming channels 100 are formed in the lower surface 102 of the fill slot plate 80, surface 102 being the surface of plate 80 that engages the upper surface 106 of mold plate 18. The rib-forming channels 100 are each of uniform cross-sectional shape throughout their lengths. As applied to channels 100, the designation "shape" refers to both configuration and dimensions. Each channel 100 extends longitudinally of closure plate surface 102 parallel to the path of movement of mold plate 18. Furthermore, each rib-forming channel 100 traverses one of the mold cavities 20 in mold plate 18. In the particular construction illustrated, there are four rib-forming channels 100 for each mold cavity 20.

Mold assembly 14 further comprises a plurality of elongated rib-forming projections on the upper surface 106 of mold plate 18. Each rib-forming projection 104 is complementary in cross-sectional shape, throughout its length, to one of the rib-forming channels 100. The rib-forming projections 104 each extend longitudinally of the mold plate and each projects into close-fitting sliding engagement in one of the rib-forming channels 100.

Mold cavities 20 and mold plate 18, as illustrated, are of parallelogram configuration, though other peripheral configurations can be utilized as noted above. As best shown in FIG. 4, each mold cavity 20 includes a plurality of pockets 108 along one edge. The pockets 108 correspond in number to and are aligned with the rib-forming projections 104 of mold plate 18.

FIG. 5 illustrates the configuration of one of the food patties 60 molded in the mold assembly 14 of FIGS. 1–4. Each patty 60 includes a plurality of ribs 114 projecting above and extending completely across the main surface 118 of the patty. Ribs 114 are formed by the combination of the rib-forming channels 100 in closure plate 80 and the mating rib-forming projections 104 of mold plate 18. Each patty 60 also includes a series of edge ribs 116 constituting extensions of ribs 114 beyond one edge 120 of the patty. These edge ribs 116 are formed in pockets 108 (see FIG. 4) during operation of mold assembly 14.

From the foregoing description, it can be seen that mold assembly 14 provides an effective and economical construction for the manufacture of molded food patties having non-planar main surfaces in a high volume food patty molding machine of the type utilizing a mold plate sliding between two mold cavity closure plates. The patty molding machine itself requires no modification. The only changes are in the main elements of the mold assembly, specifically mold plate 18 and the fill slot closure plate 80. The only other modification required in the machine, for cooperation with mold assembly 14, is the provision of knock-out members 50 shaped to cooperate with the outline configuration of each of the mold cavities 20, but this requirement is present also in conventional machines.

FIG. 6 illustrates another patty shape 160 that can be readily produced using a mold assembly constructed in accordance with the present invention. Food patty 160 has ribs 162 formed in the same manner as described above for the ribs 114 on patty 60 (FIG. 5). Instead of the simple rectangular configuration for ribs 114, however, the patty ribs 162 are of stepped configuration. Patty 160 also includes edge indentations 164 aligned with ribs 162. The edge indentations 164 are achieved by utilizing projections into the mold cavities 20 at the positions indicated for edge pockets 108 in FIG. 4.

FIG. 7 affords another illustration of the variety of shapes that can be readily obtained utilizing the present invention. The food patty 260 of FIG. 7 includes two top ribs 262 and 264 that are different in cross-sectional shape from each other. Patty 260 has three ribs 266 on its lower surface. Ribs 262 and 264 are formed by the same basic mold assembly construction as described above in connection with FIGS. 1-4. The lower ribs 266 on patty 260 are formed by providing mating rib-forming channels and projections in the upper surface of the lower closure plate 82 and the bottom surface of mold plate 18, respectively.

In the patty molding machine 10, as described in connection with FIGS. 2 and 3, the fill passage 78 is quite narrow as compared with the widths of the mold cavities 20. This construction requires that much of the food product move around a "corner" in filling the mold cavities. However, it is equally possible to employ a fill passage that is wider than the mold cavities or fill passages matched in size and configuration to the mold cavities, with an attendant improvement in patty texture, as described in the co-pending application of Glenn A. Sandberg et al, Ser. No. 204,840 filed Nov. 7, 1980, now U.S. Pat. No. 4,356,595.

Accordingly, with the present invention, a wide variety of different patties having either one or both main surface of non-planar configuration can be readily formed in a conventional reciprocating mold plate food patty molding machine simply by modifying the mold assembly. The only major limitation is that any ribs or like elements formed on a main surface of a patty must extend for the full width of the patty.

We claim:

1. In a food patty molding machine of the kind comprising:
    a mold plate including at least one mold cavity extending through the plate;
    a pair of mold closure plates, engaging opposed surfaces of the mold plate in close-fitting surface-to-surface engagement;
    mold plate drive means for cyclically driving the mold plate along a given path, between the closure plates, from a fill position to a discharge position and back to the fill position;
    a fill passage having one end extending through one closure plate, communicating with the mold cavity when the mold plate is in its fill position;
    and a food pump for pumping a moldable food product through the fill passage into the mold cavity;
    an improved mold assembly, enabling the machine to form patties having non-planar main surfaces, comprising:
    at least one rib-forming channel of uniform cross-sectional shape throughout its length formed in the surface of each closure plate engaging a surface of the mold plate, the rib-forming channel extending longitudinally of the closure plate surface parallel to the path of movement of the mold plate and traversing the mold cavity;
    and at least one rib-forming projection extending longitudinally of each closure-plate-engaging surface of the mold plate, complementary in cross-sectional shape to the rib-forming channel in the adjacent closure plate, in close-fitting sliding engagement in the rib-forming channel in the adjacent closure plate.

2. In a food patty molding machine of the kind comprising:
    a mold plate including at least one mold cavity extending through the plate;
    a pair of mold closure plates, engaging opposed surfaces of the mold plate in close-fitting surface-to-surface engagement;
    mold plate drive means for cyclically driving the mold plate along a given path, between the closure plates, from a fill position to a discharge position and back to the fill position;
    a fill passage having one end extending through one closure plate, communicating with the mold cavity when the mold plate is in its fill position;
    and a food pump for pumping a moldable food product through the fill passage into the mold cavity;
    an improved mold assembly, enabling the machine to form patties having non-planar main surfaces, comprising:
    a plurality of rib-forming channels of uniform cross-sectional shape throughout their lengths formed in the surface of a closure plate engaging a given surface of the mold plate, each rib-forming channel extending longitudinally of the closure plate surface parallel to the path of movement of the mold plate and traversing the mold cavity;
    and a plurality of rib-forming projections, complementary in cross-sectional shape to the rib-forming channels, each extending longitudinally of the given surface of the mold plate into close-fitting sliding engagement in one of the rib-forming channels;
    some of the rib-forming channels being of different cross-sectional shape from others.

3. A mold assembly for a food patty molding machine, according to claim 1, or claim 2, in which each mold cavity includes at least one edge pocket aligned with one of the rib-forming projections on the mold plate.

4. A mold assembly for a food patty molding machine, according to claim 1 or claim 2, in which each mold cavity includes at least one edge projection aligned with one of the rib-forming projections on the mold plate.

5. In a food patty molding machine of the kind comprising:
    a mold plate including at least one mold cavity extending through the plate;
    a pair of mold closure plates, engaging opposed surfaces of the mold plate in close-fitting surface-to-surface engagement;
    mold plate drive means for cyclically driving the mold plate along a given path, between the closure plates, from a fill position to a discharge position and back to the fill position;
    a fill passage having one end extending through one closure plate, communicating with the mold cavity when the mold plate is in its fill position;
    and a food pump for pumping a moldable food product through the fill passage into the mold cavity;
    an improved mold assembly comprising:
    a plurality of rib-forming channels of uniform cross-sectional shape throughout their lengths formed in the surface of one closure plate engaging a surface of the mold plate, each rib-forming channel extending longitudinally of the closure plate surface parallel to the path of movement of the mold plate and traversing the mold cavity;
    a corresponding plurality of rib-forming projections extending longitudinally of each closure-plate-engaging surface of the mold plate, complementary in cross-sectional shape to the rib-forming channels in the adjacent closure plate, in close-fitting sliding engagement in the rib-forming channel in the adjacent closure plate;
    and a corresponding plurality of edge pockets formed in the mold cavity, aligned with the rib-forming projections in the mold plate.

* * * * *